United States Patent
Depail et al.

(10) Patent No.: US 10,851,819 B2
(45) Date of Patent: Dec. 1, 2020

(54) ELEMENT FOR POSITIONING A COMPONENT IN SPACE

(71) Applicant: A. RAYMOND ET CIE, Grenoble (FR)

(72) Inventors: Yves-Marie Depail, Grenoble (FR); Mathieu Cochard, Proveysieux (FR)

(73) Assignee: A. RAYMOND ET CIE, Grenoble (FR)

( * ) Notice: Subject to any disclaimer, the term of this patent is extended or adjusted under 35 U.S.C. 154(b) by 278 days.

(21) Appl. No.: 15/774,980

(22) PCT Filed: Nov. 9, 2016

(86) PCT No.: PCT/FR2016/052901
§ 371 (c)(1),
(2) Date: May 9, 2018

(87) PCT Pub. No.: WO2017/081404
PCT Pub. Date: May 18, 2017

(65) Prior Publication Data
US 2018/0328390 A1    Nov. 15, 2018

(30) Foreign Application Priority Data

Nov. 13, 2015 (FR) .................................. 15 60888

(51) Int. Cl.
*F16B 37/04* (2006.01)
*F16B 5/02* (2006.01)
(Continued)

(52) U.S. Cl.
CPC ............ *F16B 5/0233* (2013.01); *B60Q 1/045* (2013.01); *B60Q 1/0433* (2013.01); *B60Q 1/263* (2013.01); *F16B 5/0628* (2013.01)

(58) Field of Classification Search
USPC ........................................................ 411/182
See application file for complete search history.

(56) References Cited

U.S. PATENT DOCUMENTS

| 4,923,347 A | * | 5/1990 | Moryl | ................... | F16B 37/044 |
|---|---|---|---|---|---|
| | | | | | 411/182 |
| 5,173,025 A | * | 12/1992 | Asami | ................... | F16B 37/043 |
| | | | | | 411/182 |

(Continued)

FOREIGN PATENT DOCUMENTS

| CN | 1489675 A | 4/2004 |
|---|---|---|
| CN | 1508451 A | 6/2004 |

(Continued)

OTHER PUBLICATIONS

International Search Report (PCT/ISA/210) regarding PCT/FR2016/052901 dated Feb. 2, 2017.

(Continued)

*Primary Examiner* — Gary W Estremsky
(74) *Attorney, Agent, or Firm* — Dickinson Wright PLLC

(57) ABSTRACT

An adjustable positioning element (1) enabling a component (7) to be positioned and fastened in three dimensions is provided. The element comprises a bolt (2) with which the component (7) can be positioned in an axial direction (z) of the bolt (2), a hollow body (4) presenting an annular end wall through which the bolt passes, and a fastener element (5) with a washer (25) surrounding the bolt and arranged to be movable sideways against the end wall of the hollow body (4). The washer (25) is designed to be pressed against the end wall of the hollow body when the fastener element is attached to the bolt so as to fix the lateral (xy) position of the bolt (2) in the hollow body (4). The fastener element (5) and the bolt (2) are arranged to attach to each other by reversible snap-fastening.

11 Claims, 2 Drawing Sheets

(51) Int. Cl.
*B60Q 1/04* (2006.01)
*F16B 5/06* (2006.01)
*B60Q 1/26* (2006.01)

(56) References Cited

U.S. PATENT DOCUMENTS

| | | | | |
|---|---|---|---|---|
| 5,374,136 A * | 12/1994 | LaPlante | ............... | A61G 15/16 403/370 |
| 5,711,630 A * | 1/1998 | Kodama | ............... | B60K 37/02 403/12 |
| 7,621,707 B2 * | 11/2009 | Sbongk | ............... | F16B 37/044 411/172 |
| 2002/0172574 A1 | 11/2002 | McCormack et al. | | |
| 2004/0165966 A1 | 8/2004 | Aukzemas et al. | | |
| 2006/0226312 A1 * | 10/2006 | Masuch | ............... | F16B 5/0233 248/188 |
| 2009/0190993 A1 * | 7/2009 | De Gelis | ............... | F16B 5/0233 403/47 |
| 2010/0278612 A1 * | 11/2010 | Steffenfauseweh | ... | F16B 5/0225 411/395 |
| 2011/0243655 A1 * | 10/2011 | Binder | ............... | F16B 5/0233 403/343 |
| 2013/0152294 A1 * | 6/2013 | Topcu | ............... | E03D 1/26 4/417 |
| 2013/0170895 A1 * | 7/2013 | Tseng | ............... | F16B 35/06 403/270 |
| 2014/0356063 A1 * | 12/2014 | Tung | ............... | F16B 5/065 403/374.4 |
| 2015/0330427 A1 * | 11/2015 | Johnson | ............... | F16B 5/0233 411/34 |

FOREIGN PATENT DOCUMENTS

| | | |
|---|---|---|
| CN | 101925487 A | 12/2010 |
| CN | 206290560 U | 6/2017 |
| DE | 202008002633 U1 | 5/2008 |
| EP | 0754868 A1 | 1/1997 |
| FR | 3003910 A1 | 10/2014 |
| WO | 2009106261 A1 | 9/2009 |

OTHER PUBLICATIONS

French Search Report for French Application FR 1560888 dated Jul. 14, 2016. (All references listed in this French Search Report were cited in the IDS filed with the application dated May 9, 2018).

Chinese Office Action for CN Application No. 2016109875578 dated Apr. 18, 2018.

* cited by examiner

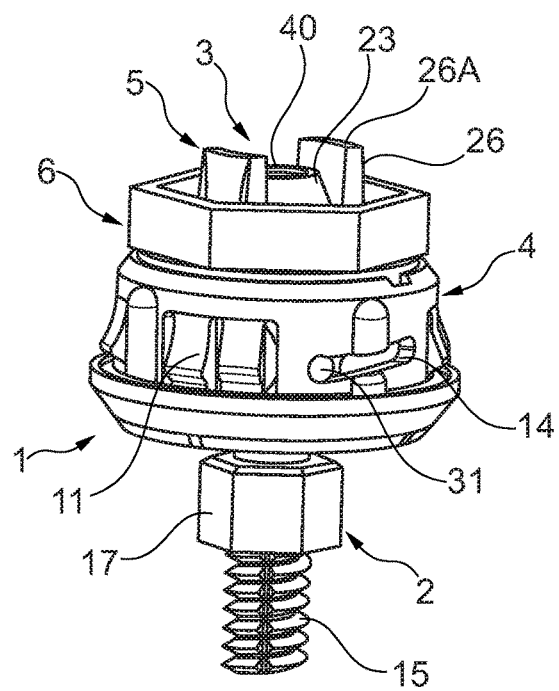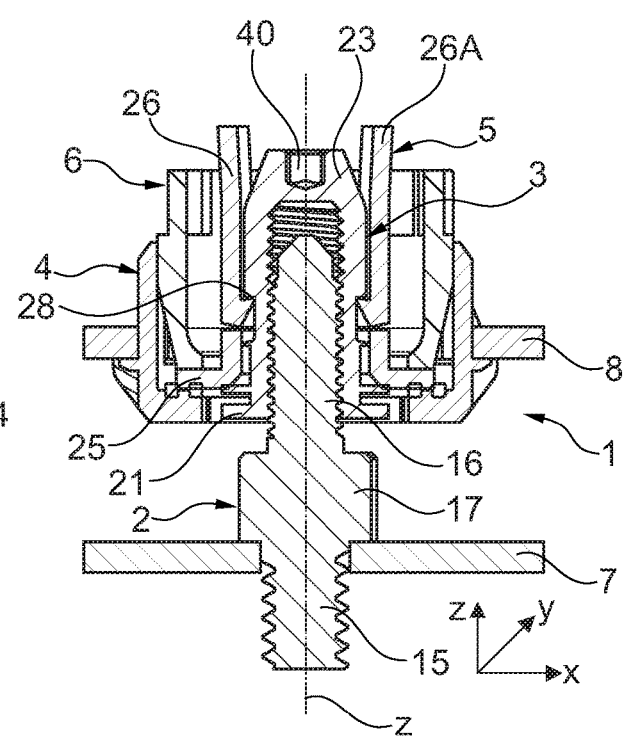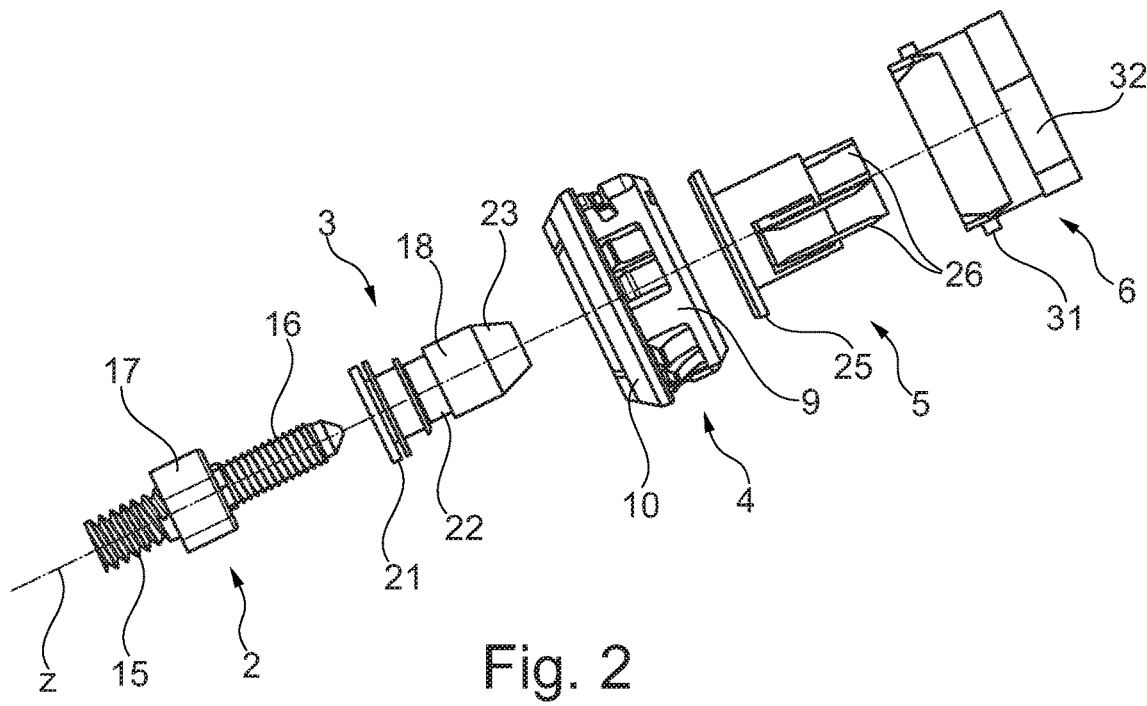

ELEMENT FOR POSITIONING A COMPONENT IN SPACE

This application is a 371 national phase entry of PCT/FR2016/052901, filed 9 Nov. 2016, which claims benefit of French Patent Application No. 1560888, filed 13 Nov. 2015, the entire contents of which are incorporated herein by reference for all purposes.

TECHNICAL FIELD

The invention relates to an adjustable positioning element enabling a component to be positioned and fastened in three dimensions.

RELATED ART

It is known to use adjustable positioning elements for fastening a component, such as a headlight housing, to a support such as a bodywork sheet of a motor vehicle.

While installing the headlight housing, it is necessary for the headlight to be properly positioned before it is fastened. Thus, known positioning elements generally comprise a hollow bolt passing a screw that is surrounded by a fastener washer, a nut-forming fastener bolt, that co-operates with the hollow bolt and the fastener washer.

The hollow bolt is screwed into the inside of an orifice for fastening the headlight housing and the fastener bolt attaches to the hollow bolt by screwing into the nut. The screw serves to position the hollow bolt within the fastener orifice in a direction z relative to the bodywork. The washer is clamped by screw-fastening between the fastener bolt and the nut of the hollow bolt when the position in the xy plane of the headlight housing has been adjusted. With that arrangement, in order to readjust the hollow in the z position, the fastener bolt must always be loosened. While loosening the fastener bolt, the xy position is lost. After the z position has been readjusted, it is therefore necessary once more to adjust the xy position. Such position readjustments lead to high costs when installing headlight housings in the motor industry.

Document U.S. Pat. No. 8,337,132 describes such a positioning element with which it is possible to modify the z position while the xy position is fixed, or to modify the xy position without modifying the z position. Nevertheless, when removing the component, e.g. during maintenance, it is necessary to unscrew the hollow bolt and the fastener bolt, thereby making it necessary once more to adjust the xy position and/or the z position.

Document EP 0 754 868 also discloses an adjustable positioning element.

SUMMARY

The object of the invention is to propose another positioning element that is simpler to use.

The invention thus provides an adjustable positioning element enabling a component to be positioned and fastened in three dimensions, the element comprising a bolt with which the component can be positioned in an axial direction of the bolt, and a hollow body presenting an annular end wall through which the bolt passes, the element being characterized in that it further comprises a fastener element with a washer that surrounds the bolt and that is arranged to be movable sideways against the end wall of the hollow body, the washer being designed to be pressed into the end wall of the hollow body when the fastener element is attached to the bolt in such a manner as to fix the lateral position of the bolt in the hollow body, and in that the fastener element and the bolt are arranged to attach to each other by reversible snap-fastening.

The positioning element of the invention may present the following features:

the fastener element may be shaped to clamp the bolt so as to provide the snap-fastening;

the fastener element may comprise a jaw formed by two opposite branches that act as spring lever arms;

it may include a nut screwed on the bolt and onto which the fastener element can snap-fasten;

the nut may be provided with a peripheral groove in which the fastener element is engaged by clamping;

the washer may be pressed into the end wall of the hollow body by a blocking element that can turn in the hollow body;

the turnable blocking element may be a bayonet bushing that locks in the hollow body by being turned;

the washer and the branches may comprise a single part;

the nut may be bullet-shaped with a top that includes a socket suitable for receiving a screw-turner tool;

the turnable blocking element may form a socket suitable for receiving a screw-turner tool;

the hollow body may be in the form of an axially hollowed-out mushroom with a head presenting a sealing surface and a stem including blocking catches; and it may be made entirely out of plastics material.

With such a positioning element of the invention, it is possible to disconnect the component from the support by separating the bolt and the fastener element by releasing the snap-fastening, and to do so without losing the axial and sideways positioning adjustment of the bolt in the hollow body.

As a result it is possible to return the component onto the support without performing a new xy adjustment or a new z adjustment of the positioning element.

BRIEF SUMMARY OF THE DRAWINGS

The present invention can be better understood and other advantages appear on reading the following description and the accompanying drawings, in which:

FIG. 1 shows an example of a positioning element of the invention;

FIG. 2 is an exploded profile view of FIG. 1;

FIG. 3 is an axial section view of a positioning element of the invention, showing a component being positioned;

DETAILED DESCRIPTION OF AN EXAMPLE EMBODIMENT

Figure 4:
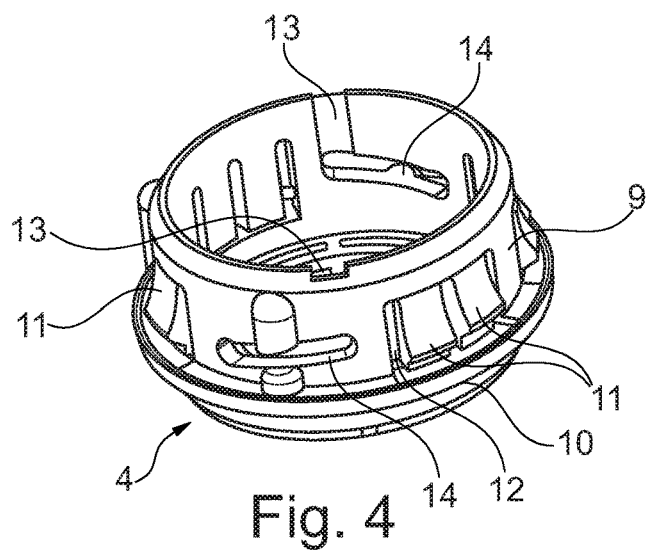
FIG. 4 is a perspective view of the hollow body of the positioning element of the invention.

FIGS. 1 and 3 show an embodiment of a positioning element 1 of the invention for enabling a component, e.g. a motor vehicle headlight housing, to be positioned and fastened in three dimensions relative to a support, specifically the bodywork of the motor vehicle.

The positioning element 1 has a plurality of component parts that may all be made out of plastics material, e.g. by injection molding or by 3D printing or the like.

These component parts are shown in particular in FIG. 1 in an assembled position and in FIG. 2 in exploded form in alignment along the axial direction z.

FIG. 3 shows the positioning element 1 of the invention between a component given reference 7 and a support given reference 8.

The positioning element 1 of the embodiment shown in FIGS. 1 to 3 comprises a bolt 2, a nut 3 that is screwed onto the bolt 2, a hollow body 4, a fastener element 5, and a blocking element 6.

The hollow body 4 is shown in perspective in FIG. 4.

In this example it is in the form of an axially hollowed-out mushroom. It comprises an axially hollowed-out head 10 presenting a rounded side facing outwards and a flat side facing inwards and forming a sealing washer that comes into leaktight contact with a pierced plate of the support 8.

The head 10 is extended axially from its side facing towards the inside by an axially hollow stem 9 having an annular edge forming a kind of feed-through that passes into the hole in the support plate 8.

The inside of the stem 9 forms a cylindrical hollow with an annular flat end wall joining the head 10, which acts as a shoulder.

The hollow stem 9 presents an outside surface that is cylindrical in this example and that is provided with a plurality of flexible fingers 11 forming blocking catches that are regularly spaced apart around a circumference of the stem 9 and that are at a certain distance from the flat side of the head 10.

At rest, the blocking catches 11 project towards the outside of the hollow stem 9 and they are suitable for retracting resiliently and radially towards the inside of the stem 9 when the hollow stem 9 is pushed into the hole in the support plate 8, so as to return resiliently to their rest position once the stem has been pushed in, such that the blocking catches 11 come to bear against the edge of the hole in the support plate 8 so as to block the hollow body 4 axially in the support plate 8.

As can be seen in FIG. 4, and in an embodiment of the invention, it is possible to provide sloping slots 14 in the cylindrical wall of the hollow stem 9, which slots act as cam-guidance grooves. In this example, there are two diametrically opposite sloping slots 14.

In this example, the bolt 2, which can be seen in FIGS. 2 and 3, includes a first thread on a first end 15 for screwing into the component 7, and a second thread on a second end 16 for co-operating in this example with the nut 3.

Between the first and second threads, the bolt 2 in this example has an intermediate zone 17 of hexagonal cross-section that acts as an engagement surface for screwing the bolt 2 into the component 7.

Figure 5A:
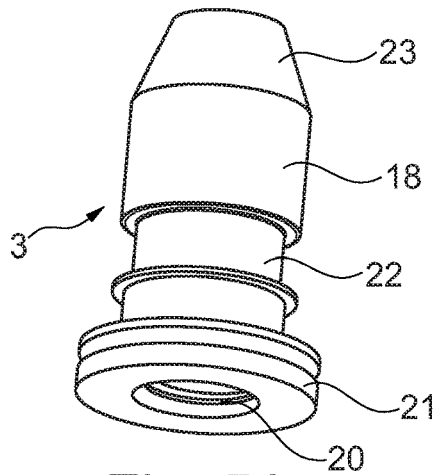
FIGS. 5A and 5B show the nut of the positioning element of the invention, respectively in a perspective view and in an axial section view.
Figure 5B:
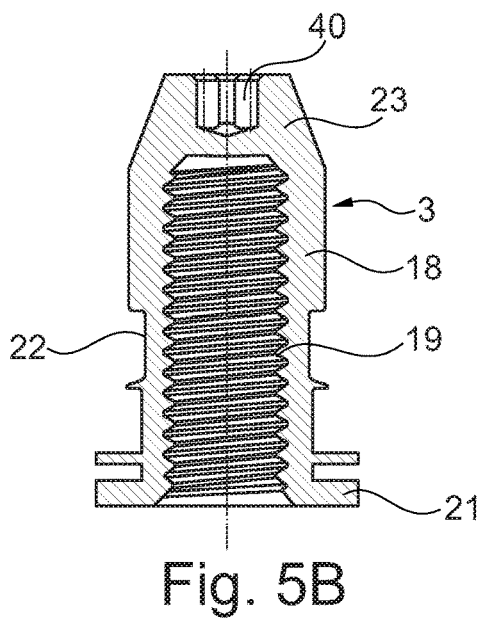

In this example, the nut 3, as shown in FIGS. 5A and 5B, is a blind nut having a bullet-shaped outside surface 18 and it is provided on the inside with a threaded bore 19 that co-operates with the threaded portion 16 of the bolt 2.

The opening 20 in the nut 3 is bordered by a flat ring 21 that extends radially outwards from the opening 20. When the nut 3 is pushed into the hollow body 4 through the head 10, the flat ring 21 becomes positioned inside the rounded side of the head 10 of the hollow body 4.

In this example, the outside surface of the nut 3 forms a peripheral annular groove 22 with straight edges for attachment purposes in a middle zone.

In this example, the bullet-shaped nut 3 has a closed frustoconical top 23 that defines a socket 40 suitable for receiving a screw-turner tool (an Allen key in this example) so as to be turned in order to be moved axially along the bolt 2.

In the invention, the fastener element 5 and the bolt 2 are designed and adapted to attach to each other by reversible snap-fastening that provides locking in the axial direction z.

In order to make it easy to attach by snap-fastening, the fastener element 5 may be shaped to clamp resiliently onto the outside surface of the bolt 2.

In this example, the fastener element 5 comprises a jaw made up of two opposite branches 26 that act as spring lever arms.

In this embodiment, the two branches 26 are secured to a washer 25 that surrounds the second end 16 of the bolt 2 when it is pushed into the hollow body 4, the washer 25 being movable laterally in the xy plane in the annular end wall of the hollow body 4 relative to the axial direction z.

Figure 6A:
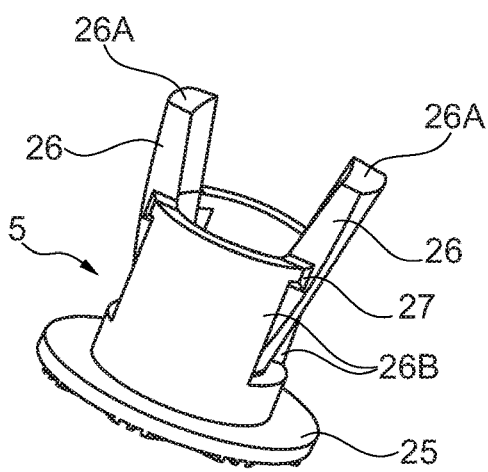
FIGS. 6A and 6B are respectively a perspective view and an axial section view of the fastener element of the positioning element of the invention.
Figure 6B:
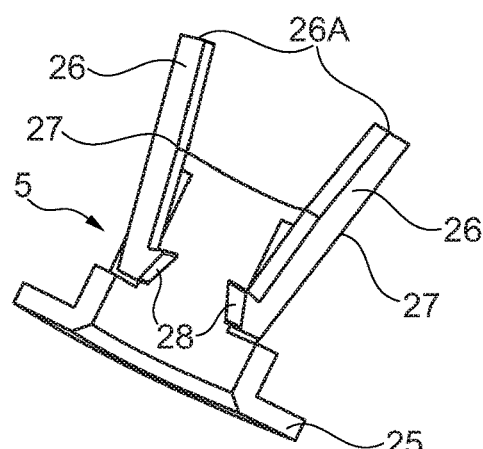

In this example, the fastener element 5, as shown in FIGS. 6A and 6B, has a sleeve on the same axis as the washer 25 with an outside diameter that is smaller than the outside diameter of the washer 25, the sleeve and the washer 25 constituting a single part.

As can be seen in FIGS. 6A and 6B, the sleeve of the fastener element 5 forms the two branches 26 in its thickness, each of which branches has a posterior (rear) portion acting as a spring lever arm and an anterior (front) portion that forms a jaw portion.

In this example, each branch 26 has a pivot hinge zone 27 that is connected to the sleeve and that is suitable for deforming elastically by twisting resiliently.

The anterior (front) portion of each branch 26 has a free end forming a hook 28 that is to engage in the annular groove 22 of the nut 3 in order to attach against the straight edges of the groove 22.

The posterior (rear) portion 26A of each branch 26 extends obliquely along the axial direction z outside the sleeve of the fastener element 5 and over it so that the two posterior portions 26A of the two branches 26 can easily be moved manually towards each other in order to move apart the right-angled hook-shaped ends 28 forming the jaw so as to release the attaching on the nut 3. When they are released, the two posterior portions 26A of the two branches 26 move apart from each other, thereby causing the jaw to close.

In this embodiment, the spring zone 27 has a spring effect and it is made by the material of the top edge of the sleeve of the fastener element 5, and the hook 28 of the branches 26 project radially towards the inside of the sleeve through openings 26B formed in the cylindrical surface of the sleeve of the fastener element 5.

Figure 7:
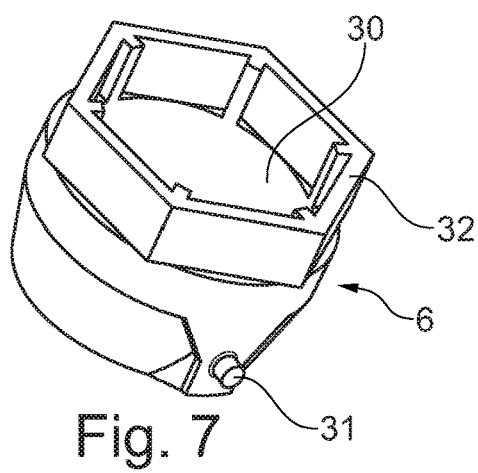
FIG. 7 is a perspective view of the blocking element of a positioning element of the invention.

The blocking element 6, shown on its own in FIG. 7, is in the form of a kind of cylindrical bayonet bushing having an axial bore 30. The blocking element 6 is designed to be inserted axially in the hollow body 4 around the fastener element 5 so as to clamp the washer 25 against the annular shoulder of the hollow body 4.

As can be seen in FIG. 7, the blocking element 6 in the form of a bayonet bushing has two diametrically opposite lugs 31 that project radially to be engaged in respective ones of the sloping slots 14 or cam guidance grooves that are formed in the stem 9 of the hollow body 4.

The bayonet bushing 6 has an annular base of inside diameter that is smaller than the outside diameter of the washer 25, but that is greater than the diameter of the sleeve of the fastener element 5. In this example, the bayonet bushing 6 has an outside surface 32 that forms a socket, which is hexagonal in this example, for the purpose of co-operating with a tool in order to be able to turn the blocking element 6 inside the hollow body 4, such turning acting by a camming effect of the lugs 31 in the slots 14 to move the blocking element 6 axially towards the end wall of the hollow body 4 and clamp the washer 25 against the bayonet bushing 6 and the end wall of the hollow body 4. This clamping is performed by turning the bayonet bushing 6 through one-eighth of a turn.

It is possible to have a blocking element 6 of some other shape, e.g. a hollow bolt that screws in a thread of the hollow body.

The main use for the positioning element 1 is as follows.

The mushroom-shaped hollow body 4 is initially inserted axially and blocked in a circular hole in the support 8. The head 10 of the hollow body 4 presses against a face of the support 8 and provides sealing against water runoff through the circular hole.

The fastener element 5 with the lever arm branches 26 is then inserted inside the stem 9 of the hollow body 4, the washer 25 resting flat against the annular end wall of the hollow body 4.

The blocking element 6 in the form of a bayonet bushing is then put into place in the hollow body 4, which is provided with two diametrically opposite axial grooves (reference 13 in FIG. 4) that are formed in the inside surface of the stem and that open out into the slots 14 so as to be able to bring the lugs 31 in axial translation into the tops of the slots 14 of the hollow body 4.

In this position, the washer 25 of the fastener element is not clamped against the end wall of the hollow body 4 and the fastener element 5 can thus move freely sideways against the end wall of the hollow body 4.

The bolt 2 is then fastened to the component by screw-fastening and is provided with the bullet-shaped nut 3, which is screwed tight up to the intermediate zone 17.

The bullet-shaped nut 3 screwed onto the bolt 2 (together with the component) faces the head 10 of the hollow body 4 and the bullet-shaped nut 3 is inserted therethrough into the stem 9 of the hollow body 4. The frustoconical end of the bullet-shaped nut 3 then penetrates into the sleeve of the fastener element 5, and spaces apart the anterior (front) portions of the two branches 26 resiliently until they clamp in the groove 24 and become attached therein by snap-fastening.

At this moment, the bolt 2 with the nut 3 is locked in the axial direction z relative to the washer 25 of the fastener element 5.

In this position of the positioning element 1, it is possible, manually, to adjust the position of the component 7 relative to the support 8 in the axial direction z (see FIG. 3) by turning (tightening/loosening) the nut 3 by using a tool for engaging the socket 24.

Once the position z has been adjusted, it is possible to adjust the sideways position (relative to the axis z) of the component 7 in the directions xy (see FIG. 3) by moving the washer 25 sideways against the end wall of the hollow body 4.

When the appropriate xy sideways position has been adjusted, the blocking element 6 in the form of a bayonet bushing is turned so as to clamp the washer 25 against the end wall of the hollow body 4.

Thereafter, the bolt 2, and thus the component 7, is held in position and stationary in all three directions x, y, and z relative to the support 8.

An advantage of this arrangement is that it is possible to take the bolt 2 out of the hollow body 4 without modifying the xyz adjustments became of the reversible snap-fastening. Specifically, it suffices to release the lever arm branches 26 from the groove 22 by moving them towards each other so as to space apart the hooks 28 and separate them from the groove 22.

The bullet-shaped nut 3 with the bolt 2 can then be extracted axially from the hollow body 4, and can then once more be inserted axially (e.g. after taking action on the component 8) into the hollow body 4, while conserving the xyz positioning adjustments.

It should be understood that the arrangement of the positioning element 1 of the invention also enables the xy position to be adjusted followed by adjusting the z position.

The various parts 2, 3, 4, 5, and 6 of the positioning element 1 of the invention can be fabricated at low cost by molding plastics material, and if a short run is to be fabricated, they can be fabricated at low cost additively in a 3D printer, for example.

It should be observed that the various portions of the positioning element 1 of the invention may be of shapes other than those shown in the drawings, providing the bolt 2 attaches the fastener element 5 to a washer by reversible snap-fastening.

For example, the fastener element 5 could have a single lever arm branch 26.

The snap-fastening could also be performed using a "circlip" type spring ring, or the like.

The invention claimed is:

1. An adjustable positioning element enabling a component to be positioned and fastened in three dimensions, said adjustable positioning element comprising a bolt with which said component can be positioned in an axial direction of said bolt, and a hollow body presenting an annular end wall through which said bolt passes, wherein said adjustable positioning element further comprises a fastener element with a washer that surrounds said bolt and that is movable sideways in said end wall of the hollow body relative to said axial direction, said washer being pressed into said end wall of said hollow body by a blocking element to fix the lateral position of said bolt in said hollow body, a nut being screwed onto said bolt, and wherein said fastener element and said nut attach to each other by reversible snap-fastening.

2. An adjustable positioning element according to claim 1, wherein said fastener element is shaped to clamp said nut so as to provide the snap-fastening.

3. An adjustable positioning element according to claim 2, wherein said fastener element comprises a jaw formed by two opposite branches that act as spring lever arms.

4. An adjustable positioning element according to claim 1, wherein said nut is provided with a peripheral groove in which said fastener element is engaged by clamping.

5. An adjustable positioning element according to claim 1, wherein said blocking element can turn in said hollow body.

6. An adjustable positioning element according to claim 5, wherein said turnable blocking element is a bayonet bushing that locks in said hollow body by being turned.

7. An adjustable positioning element according to claim 3, wherein said washer and said branches comprise a single part.

8. An adjustable positioning element according to claim 1, wherein said nut is bullet-shaped with a top that includes a socket suitable for receiving a screw-turner tool.

9. An adjustable positioning element according to claim 5, wherein said turnable blocking element forms a socket suitable for receiving a screw-turner tool.

10. An adjustable positioning element according to claim 1, wherein said hollow body is in the form of an axially hollowed-out mushroom with a head presenting a sealing surface and a stem including blocking catches.

11. An adjustable positioning element according to claim 1, wherein said adjustable positioning element is made entirely out of plastic material.

\* \* \* \* \*